(12) United States Patent
Van Der Ende (10) Patent No.: US 9,388,894 B2
(45) Date of Patent: Jul. 12, 2016

(54) DIVISIBLE SPROCKET WHEEL (75) Inventor: Remco Van Der Ende, De Lier (NL)

(73) Assignee: REXNORD FLATTOP EUROPE B.V., 'S-Gravenzande (NL)

(*) Notice: Subject to any disclaimer, the term of this patent is extended or adjusted under 35 U.S.C. 154(b) by 2047 days.

(21) Appl. No.: 12/517,764

(22) PCT Filed: Dec. 5, 2007

(86) PCT No.: PCT/NL2007/050625
§ 371 (c)(1),
(2), (4) Date: Feb. 4, 2010

(87) PCT Pub. No.: WO2008/069661
PCT Pub. Date: Jun. 12, 2008

(65) Prior Publication Data
US 2010/0160097 A1 Jun. 24, 2010

(30) Foreign Application Priority Data

Dec. 5, 2006 (NL) .................................. 1032993
Feb. 5, 2007 (NL) .................................. 1033338

(51) Int. Cl.
*F16H 55/12* (2006.01)
*F16H 55/46* (2006.01)
*F16H 55/30* (2006.01)

(52) U.S. Cl.
CPC ............... *F16H 55/30* (2013.01); *F16H 55/12* (2013.01); *Y10T 29/49455* (2015.01)

(58) Field of Classification Search
CPC ......... F16H 55/30; F16H 55/12; F16H 55/46; Y10T 403/69; F16D 1/0864

USPC .................... 474/95, 96, 98, 99, 152
See application file for complete search history.

(56) References Cited

U.S. PATENT DOCUMENTS

| | | | | |
|---|---|---|---|---|
| 237,118 A * | 2/1881 | Medart | ........................... | 474/95 |
| 656,944 A * | 8/1900 | Clark | ............................... | 474/95 |
| 1,217,371 A * | 2/1917 | Vestine | ........................... | 474/96 |
| 1,363,772 A * | 12/1920 | Gilbert | ............................ | 474/95 |
| 1,382,829 A * | 6/1921 | Gilbert | ............................ | 474/99 |

(Continued)

FOREIGN PATENT DOCUMENTS

| | | |
|---|---|---|
| EP | 0 561 478 A | 9/1993 |
| EP | 0 757 191 A1 | 2/1997 |
| EP | 0 890 533 A | 1/1999 |

OTHER PUBLICATIONS

International Search Report and Written Opinion under date of Apr. 1, 2008 in connection with PCT/NL2007/050625.

*Primary Examiner* — Henry Liu
(74) *Attorney, Agent, or Firm* — Quarles & Brady LLP (57) ABSTRACT

A sprocket wheel built up from at least two synthetic wheel parts (2, 3), comprising a hub part (4a, 4b), a gear ring (5) and a body part (6) connecting the hub part and gear ring, having a central plane forming a plane of symmetry of the body part, at least one fastener housing (7) divided over the two wheel parts, having a fastener hole (8) extending along a centerline situated in the central plane, for receiving a fastener (9), and, at least one gear ring opening (10) extending through the gear ring, situated in line with the fastener hole, characterized in that the body part comprises a recess (11) accessible from a side of the body part to a fastener, which recess is situated in line between the gear ring opening and the fastener housing and whose passage towards the fastener housing is greater than the passage of the gear ring opening (10).

15 Claims, 6 Drawing Sheets

(56) References Cited

U.S. PATENT DOCUMENTS

| | | | | |
|---|---|---|---|---|
| 1,721,066 | A * | 7/1929 | Bowen | 474/96 |
| 2,236,027 | A * | 3/1941 | Bowen et al. | 474/96 |
| 2,465,570 | A * | 3/1949 | Bocchino | 474/98 |
| 3,501,972 | A * | 3/1970 | Morrow et al. | 474/95 |
| 3,789,687 | A * | 2/1974 | Cutter | 474/152 |
| 4,253,344 | A * | 3/1981 | Kerklies | 474/96 |
| 5,037,356 | A * | 8/1991 | Gladczak et al. | 474/95 |
| 5,052,842 | A * | 10/1991 | Janatka | 403/14 |
| 5,158,505 | A * | 10/1992 | Woyach | 474/95 |
| 5,322,478 | A * | 6/1994 | Bos et al. | 474/95 |
| 5,702,316 | A * | 12/1997 | Cole | 474/96 |
| 5,810,686 | A * | 9/1998 | de Jong et al. | 474/96 |
| 5,833,562 | A * | 11/1998 | Walker, Sr. | 474/96 |
| 5,848,947 | A * | 12/1998 | Fornasiere et al. | 474/96 |
| 6,074,316 | A * | 6/2000 | Murrietta, Sr. | 474/96 |
| 2003/0144098 | A1 * | 7/2003 | Fye et al. | 474/95 |

* cited by examiner

DIVISIBLE SPROCKET WHEEL

CROSS REFERENCE TO RELATED APPLICATOINS

This application represents the national stage application of International Application PCT/NL2007/050625 filed Dec. 5, 2007, which claims the benefit of Netherlands Patent Application 1032993 filed Dec. 5, 2006, and Netherlands Patent Application 1033338 filed Feb. 5, 2007, which are incorporated herein by reference in their entirety for all purposes.

This invention relates to a sprocket wheel built up from at least two synthetic wheel parts.

A divisible synthetic sprocket wheel is generally known and is used in, for instance, chain conveyors or modular mat conveyors where a number of sprocket wheels are placed on a shaft. A divisible sprocket wheel can be removed from the shaft without requiring the shaft to be detached.

EP 0 757 191 for instance describes a divisible sprocket wheel manufactured from synthetic material, which consists of two parts. An advantage of this sprocket wheel is that fastener openings designed as cylindrical holes are situated in the gear ring of one wheel part, so that the fastener openings are well accessible from above and the intermediate space between two successive sprocket wheels on the shaft can be limited. Via the fastener opening, a bolt can be supplied which, by means of a screwdriver reaching through the fastener opening, can be tightened to secure the two wheel parts. A disadvantage of such a divisible sprocket wheel is that dirt can collect in the fastener openings, which is unwanted for reasons of hygiene. It has previously been attempted to close the fastener openings with a cap, but this entails the disadvantage that dirt can collect on, around and under the cap, so that dirt can still find its way to the bolt, which dirt cannot be removed in cleaning because the opening is closed. Also, the cap may fall out of the fastener opening.

The object of the invention is to obviate the above-mentioned disadvantages while maintaining the above-mentioned advantages. To this end, the invention provides a sprocket wheel built up from at least two synthetic wheel parts, comprising a hub part, a gear ring and a body part connecting the hub part and gear ring, having a central plane forming a plane of symmetry of the body part, at least one fastener housing divided over the two wheel parts, having a fastener hole extending along a centerline situated in the central plane, for receiving a fastener, and at least one gear ring opening reaching through the gear ring, situated in line with the fastener hole, while the body part comprises a recess accessible from a side of the body part to a fastener, which recess is situated in line between the gear ring opening and the fastener housing and whose passage towards the fastener housing is greater than the passage of the gear ring opening.

By the use of a recess in the body part which is accessible from a side and which is situated in line with the gear ring opening and the fastener housing, a fastener, for instance a bolt, can be laid from a side in the recess in a simple manner. The bolt then no longer needs to be supplied via the gear ring openings, so that the gear ring openings can be made of smaller design and the passage of the recess towards the fastener housing can be greater than the passage of the gear ring opening.

By virtue of the smaller gear ring opening and the use of a recess that is accessible from a side, the cleanability of the sprocket wheel is enhanced. As the recess is wholly or partly open, the dirt that would collect in it can be simply flushed away during a cleanup and no dirt is left behind. The gear ring opening can then be a hole enclosed by the material of the gear ring, but may also be, for instance, a notch bounded by the material of the gear ring and which is open at a side of the gear ring.

By making the passage of the gear ring opening of smaller design than the passage of the recess towards the fastener housing, it is accomplished that a fastener, for instance a bolt, cannot pass through the gear ring opening, whereas a fastening tool, for instance a screwdriver, can. Since the openings in the gear ring can be smaller, also a better stability of the sprocket wheel is achieved.

In an advantageous embodiment, the sprocket wheel comprises two wheel parts of which a first wheel part comprises two gear ring openings and two recesses designed as lay-in slots, which are in line with the fastener housings. By designing the recess as a lay-in slot, a fastener, for instance a bolt, can be simply laid in the lay-in slot from a side, and the bolt is supported laterally. The bolt is supported by the lay-in slot during tightening for the purpose of fastening the two wheel parts with a screwdriver reaching through the gear ring opening. Also, by the support of the bolt during tightening, tightening and fastening are facilitated.

The invention further relates to a method for connecting synthetic wheel parts to form a sprocket wheel.

Further advantageous embodiments of the invention are represented in the subclaims.

The invention will be further elucidated with reference to three exemplary embodiments represented in a drawing. In the drawing.

The figures are only schematic representations of a preferred embodiment of the invention, and are given by way of non-limiting exemplary embodiment. In the figures, corresponding parts are designated by corresponding reference numerals.

Figure 1:
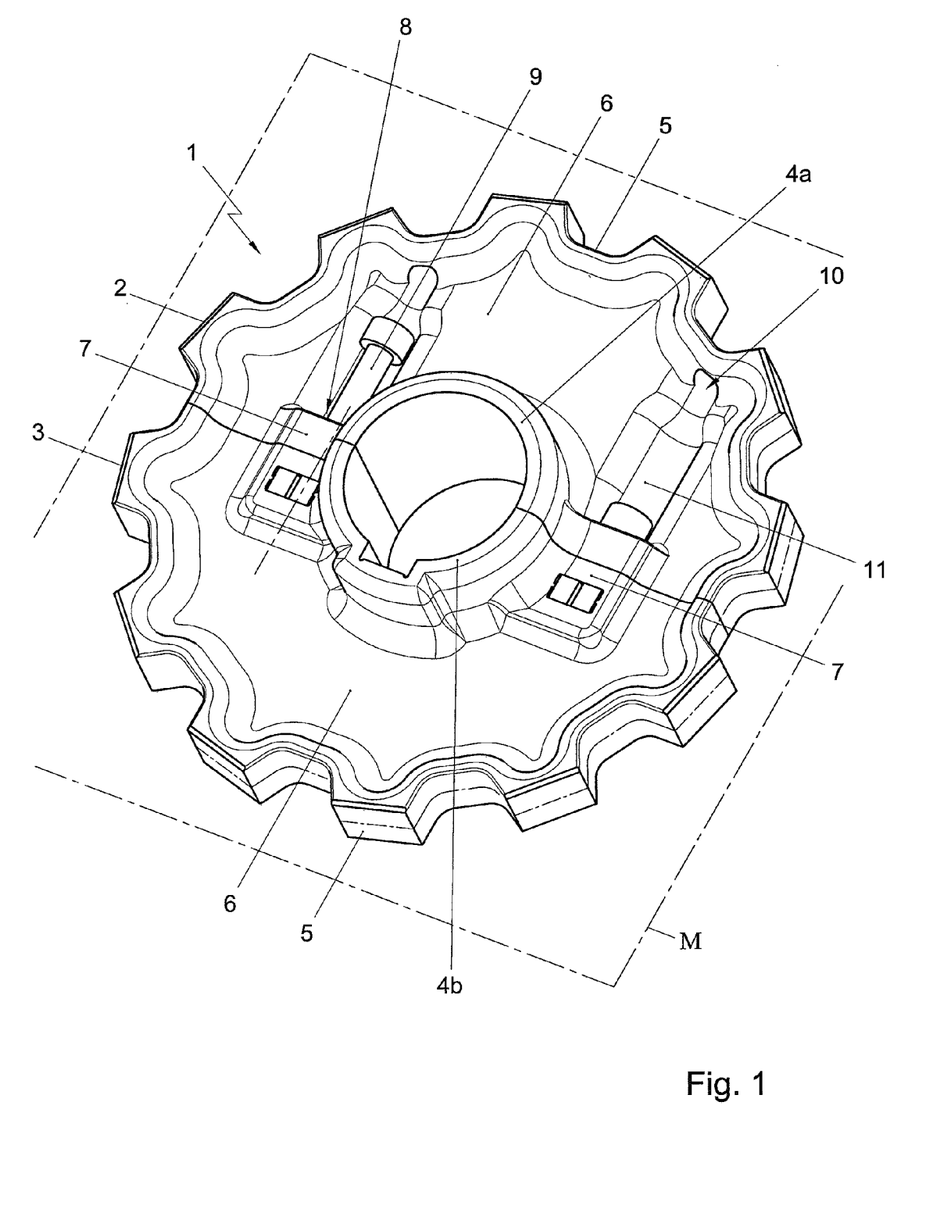
FIG. 1 shows a schematic perspective view of the front of a first embodiment of a sprocket wheel according to the invention.
Figure 2:
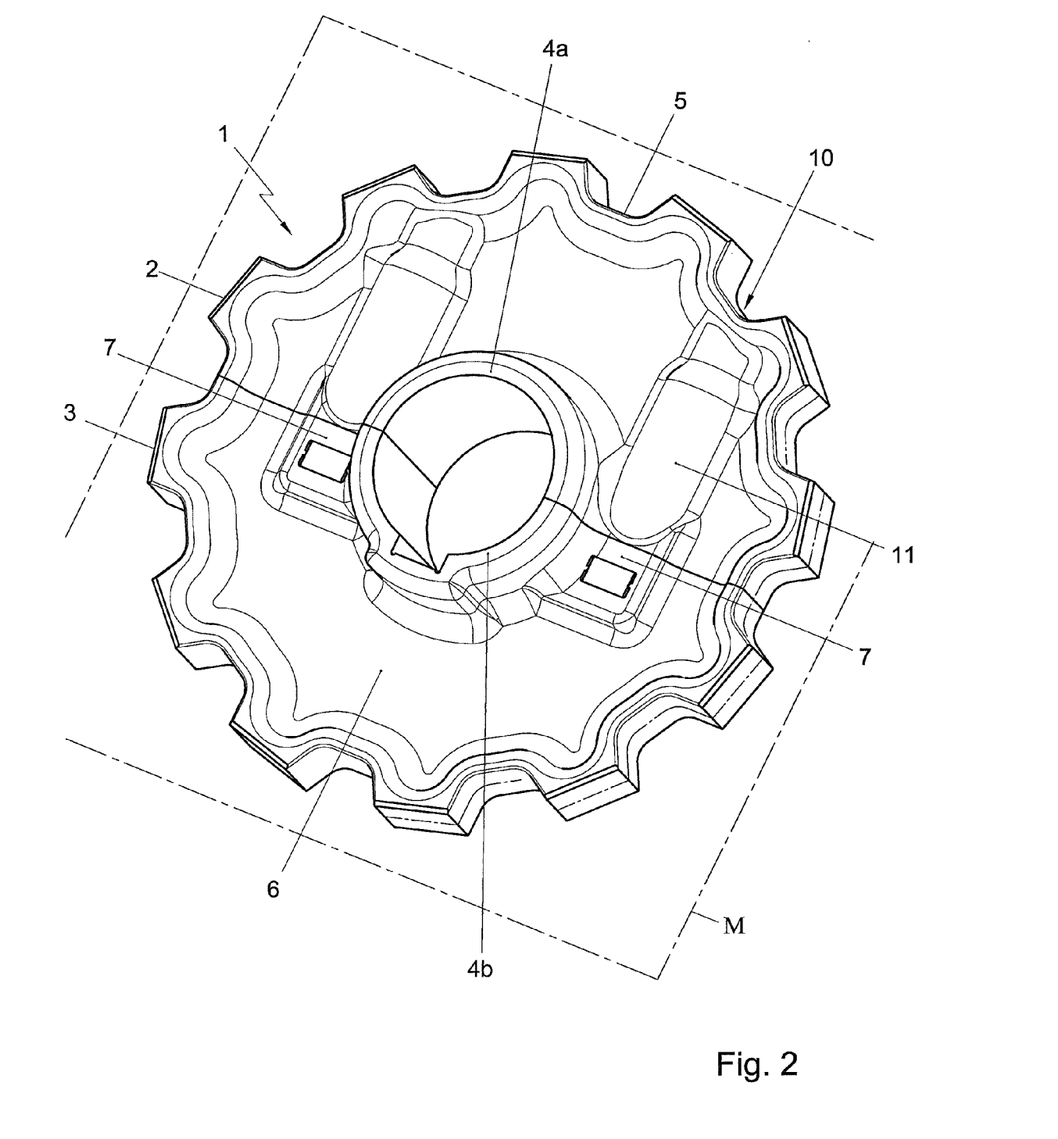
FIG. 2 shows a schematic perspective view of the back of the sprocket wheel of FIG. 1.

In FIGS. 1 and 2, a sprocket wheel 1 is shown which is built up from two synthetic wheel parts 2, 3, each forming a half of the sprocket wheel. The wheel parts 2, 3 comprise, respectively, a hub part 4a, 4b and a gear ring 5. The hub part 4a, 4b and the gear ring 5 are connected by means of a body part 6. The body part 6 has a central plane M which is formed by the plane of symmetry of the body part 6, the body part 6 being symmetric relative to the central plane M in axial direction.

The sprocket wheel 1 comprises a fastener housing 7 which is divided over the two wheel parts 2, 3. In this exemplary embodiment, the sprocket wheel 1 is provided with two fastener housings 7. The fastener housing 7 has a fastener hole 8 which is likewise divided over the two wheel parts 2, 3 and whose centerline is situated in the central plane M. In the fastener hole 8, a fastener 9, for instance a screw or a bolt, can be received.

Figure 3:
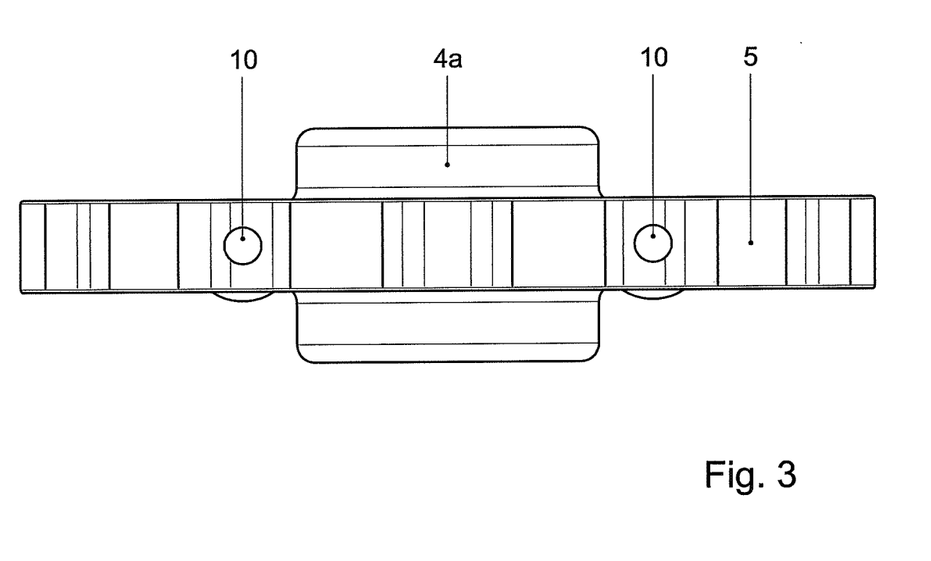
FIG. 3 shows a top plan view of a sprocket wheel according to the invention.

Via a gear ring opening 10 in the gear ring, as shown in FIG. 3, a fastening tool, for instance a screwdriver, can tighten the bolt in the fastener hole 8. In this embodiment, the gear ring opening 10 is designed as a hole enclosed by the material of the gear ring 5. By fastening the bolt in the fastener hole 8, the two parts of the fastener housing 7 are connected with each other, so that the two wheel parts 2, 3 form the sprocket wheel 1.

In the exemplary embodiment of FIG. 1, the body part 6 comprises a recess 11 which is accessible from a side of the body part 6 to the fastener 9. In this exemplary embodiment, the recess 11 is designed as a lay-in slot which is semicylindrical, so that in a simple manner in the lay-in slot a bolt can be laid, which is thereupon supported by the lay-in slot during tightening.

As shown in FIG. 1, the recess 11 in this exemplary embodiment extends between the gear ring opening 10 and the fastener housing 7. The recess 11 is in line with the fastener housing 7 and the gear ring opening 10, so that when a bolt is laid in the recess 11, the bolt can be tightened by means of a tool, for instance a screwdriver, which can be inserted through the gear ring opening 10. The tool is then in line with the bolt in a simple manner, which facilitates tightening.

Accordingly, the passage of the gear ring opening 10 can be smaller than the passage of the recess 11. This is because the head of the bolt 9 does not need to pass through the gear ring opening 10, since the bolt 9 can be laid in the lay-in slot 11 from the side. The gear ring opening only needs to be sufficiently large to allow a working portion of a screwdriver or other fastening tool to pass.

By making use of a fastener housing 7 which is divided over two wheel parts 2, 3, and because both gear ring openings 10 are in the first wheel part 2, the two wheel parts 2, 3, as shown in FIG. 1, are of different design. The first wheel part 2 comprises a portion of the fastener housing 7, the recesses 11 and the gear ring openings 10. A second wheel part 3 comprises a second portion of the fastener housing 7. The two parts 2, 3 and the two parts of the fastener housing 7 are joined together by tightening a bolt 9 in the fastener hole 8 of the fastener housing 7.

As both gear ring openings 10 are situated in the first wheel part 2, the wheel parts 2, 3 can be secured on a shaft by a mechanic from a single posture. This is facilitated further by designing the gear ring openings 10 to be substantially parallel to each other, as shown in the exemplary embodiment of FIGS. 1 and 2. The recesses 11 and the fastener holes 8 in the fastener housings 7 are also substantially parallel to each other.

In the exemplary embodiment of FIGS. 1 and 2, the recess 11, which extends between the gear ring opening 10 and the fastener housing 7, has a staggered passage, in particular a staggered width. In the case of this exemplary embodiment with a cylindrical lay-in slot as recess 11, the passage of the recess is the width of the lay-in slot. The width of the lay-in slot 11 adjacent the gear ring opening 10 is smaller than the width of the lay-in slot 11 adjacent the fastener housing 7. In the portion of the lay-in slot 11 having the greater width, the fastener 9, such as a screw or a bolt, can be laid. As the width towards the gear ring opening 10 is smaller, the fastener, such as, for instance, the bolt 9, cannot move through the lay-in slot to the gear ring opening 10, but can move to the fastener housing 7. A tool, such as a hexagonal socket head wrench can pass through the part of the lay-in slot having the smaller width. Optionally, the portion of the lay-in slot 11 having the greater width can have a length corresponding to a length of the bolt for fastening the two wheel parts 2, 3 in the fastener hole 8. The bolt can then be readily laid in the portion of the lay-in slot having the greater width and continues to lie stably in it until it is tightened, because the length and preferably also the width of this portion of the lay-in slot correspond approximately to the length and head diameter of the bolt.

Figure 4:
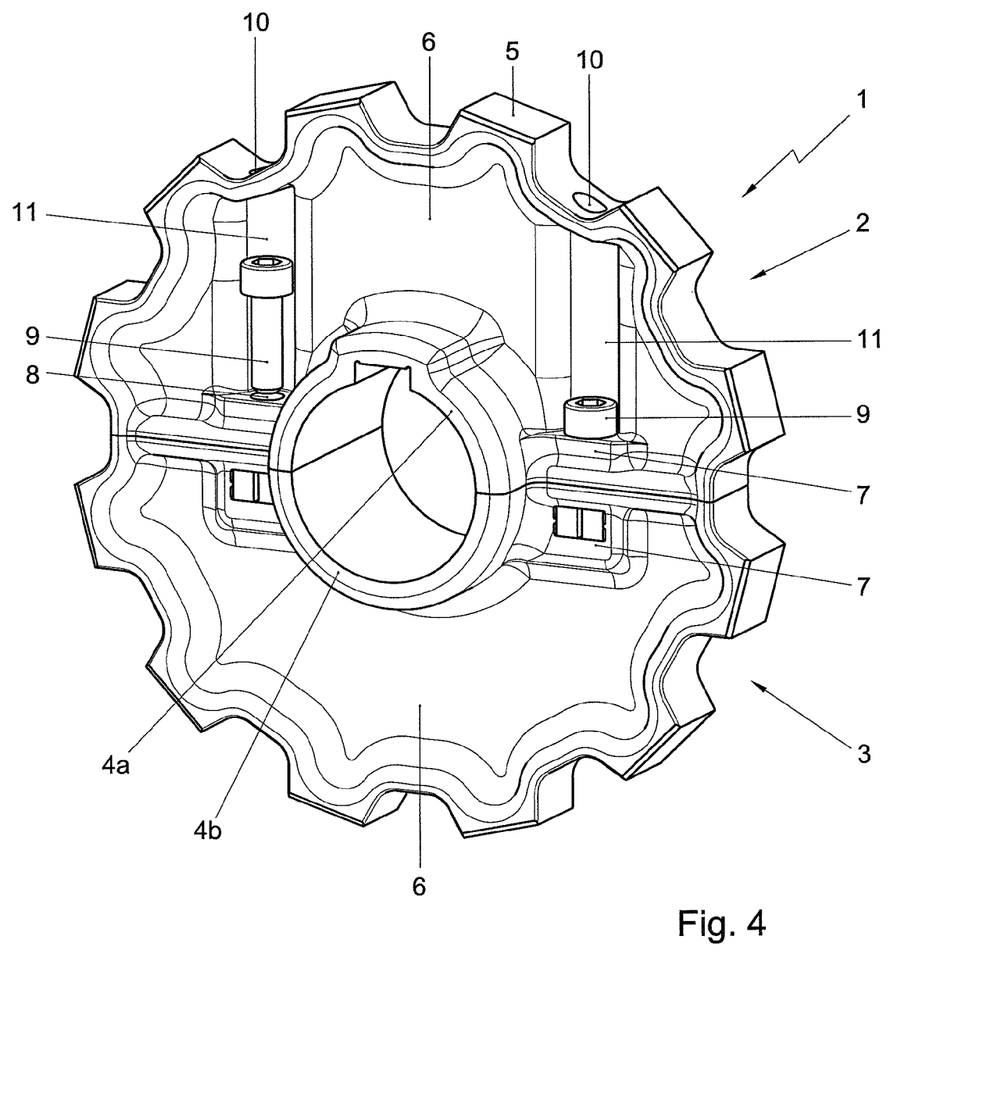
FIG. 4 shows a schematic perspective view of the front of a second embodiment of a sprocket wheel according to the invention.
Figure 5:
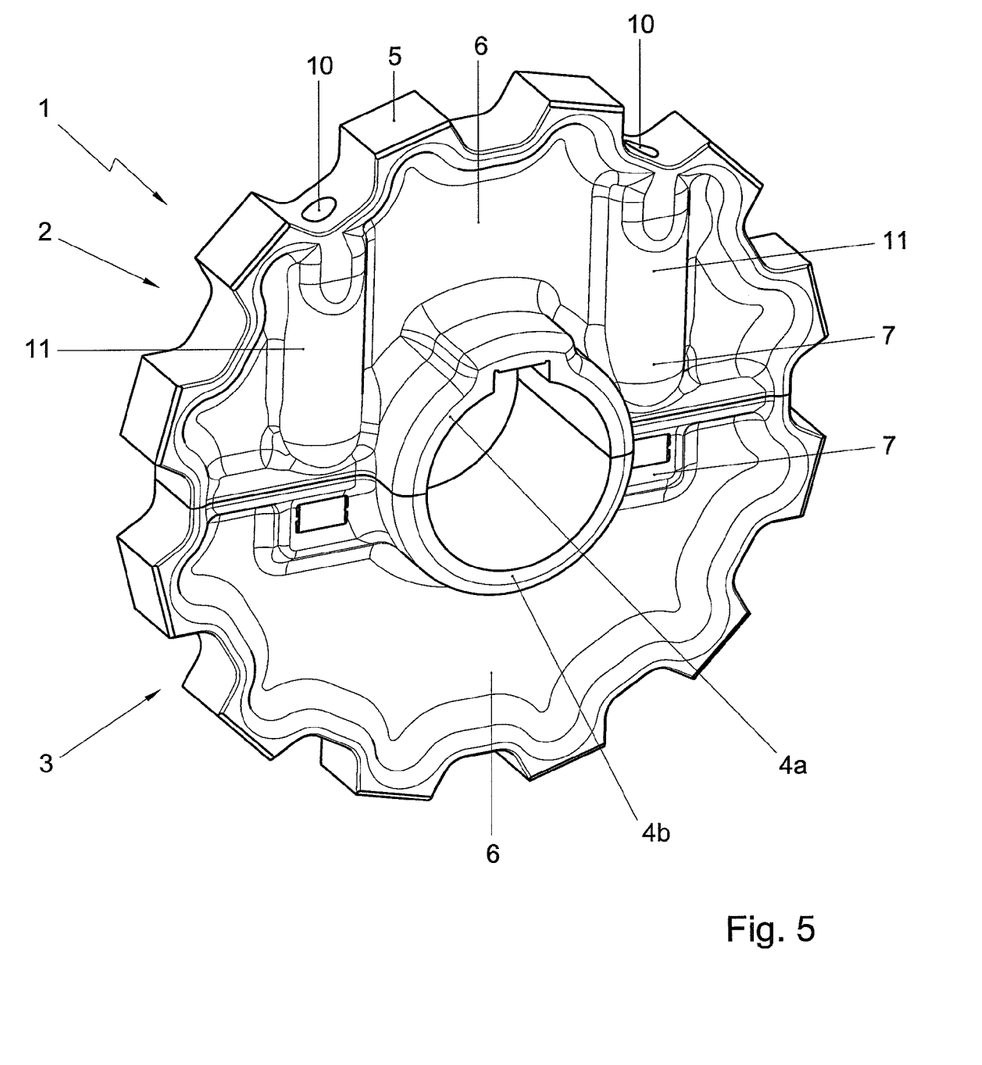
FIG. 5 shows a schematic perspective view of the back of the sprocket wheel of FIG. 4.

Referring to FIGS. 4 and 5, there is shown a second embodiment of a sprocket wheel 2. In this embodiment, the recess 11 is designed as a cylindrical lay-in slot of substantially constant diameter. The diameter of the lay-in slot is greater than the diameter of the gear ring opening 10, here designed as a cylindrical hole.

Figure 6:
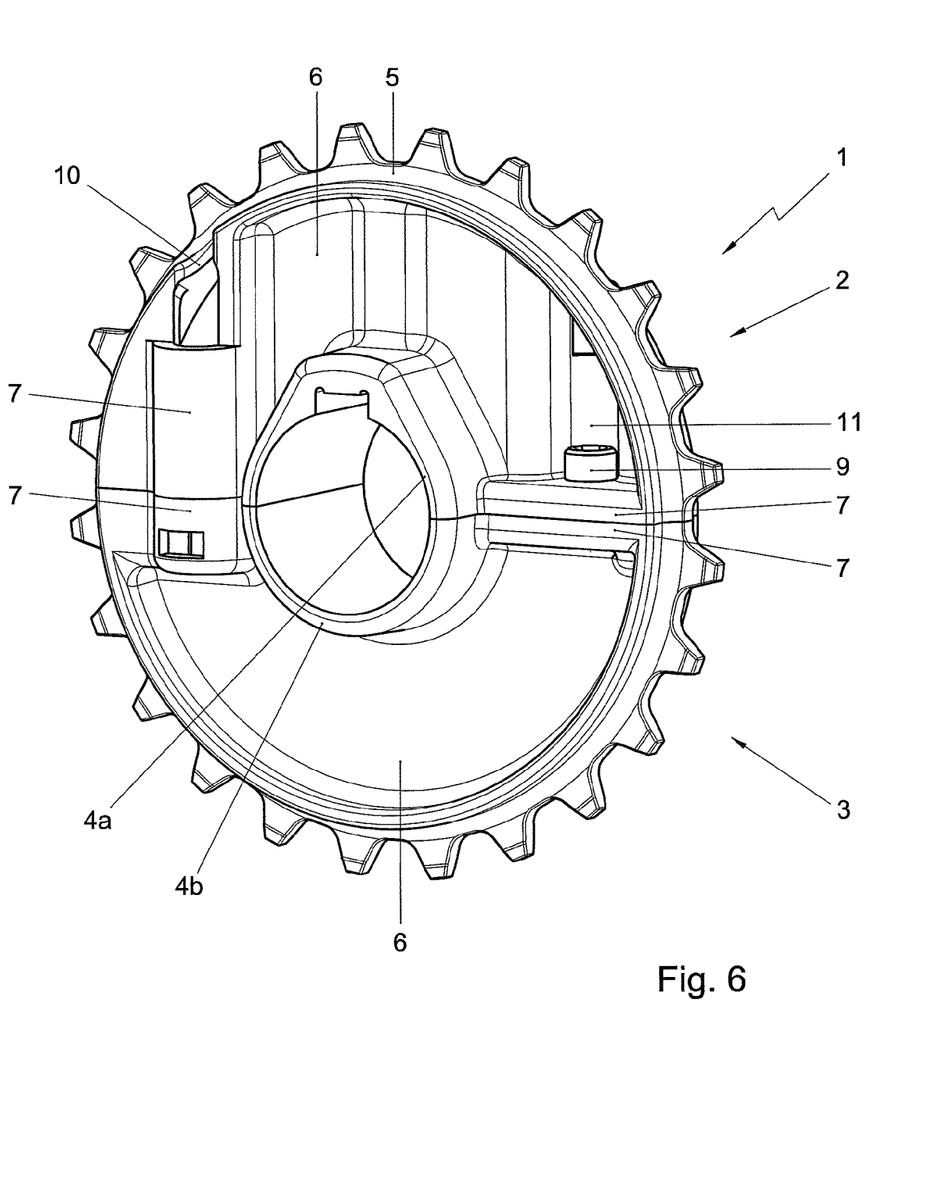
FIG. 6 shows a schematic perspective view of a third embodiment of a sprocket wheel according to the invention.

Referring to FIG. 6, there is shown a third embodiment of the sprocket wheel 1. In this embodiment, the gear ring opening 10 is designed as a notch bounded by the material of the gear ring 5, which notch is open from a side of the gear ring 5. Furthermore, in this embodiment, the recess 11 is of at least partly open design. In particular, the part of the recess 11 situated nearer to the gear ring 5 is designed as an open slot. The part of the recess 11 situated nearer to the fastener housing 7 is here designed as a semicylindrical closed lay-in slot of substantially constant diameter. The first wheel part 2 is provided with recesses 11 directed away from each other. Hence, the recesses 11 are each accessible to the fastener 9 from a different side of the body part 6.

Other designs are also possible. For instance, the gear ring openings may be situated at an angle with respect to each other. Since the gear ring opening is in alignment with the recess and the fastener hole, the aligned recess and fastener hole may likewise be situated at an angle with respect to a second recess and fastener hole. Also, the recess may be entirely open, so that the lay-in slot is absent. Further, the recess can throughout its length have the same passage, which is greater than the passage of the gear ring opening. Also, there may be more than two fastener housings in the wheel parts, or a fastener housing may be provided torsionally around the fastener hole in the body part.

Such variants will be clear to those skilled in the art and are understood to be within the scope of the invention as set forth in the following claims.

The invention claimed is:

1. A sprocket wheel comprising:
at least two synthetic wheel parts joined by a fastener, at least one of said at least two wheel parts including a hub part, at least a portion of a gear ring and a body part connecting the hub part and gear ring, the body part having a central plane forming a plane of symmetry of the body part, at least one fastener housing divided over the at least two wheel parts, and a fastener hole extending along a centerline situated in the central plane for receiving a fastener, and at least one gear ring opening extending through the gear ring, wherein the body part further includes a recess accessible from a side of the body part to a fastener, the recess being situated in line between the gear ring opening and the fastener hole and having a wider passage than a passage of the gear ring opening, said recess receiving said fastener and aligning the fastener received in the recess with the fastener hole along the centerline.

2. A divisible sprocket wheel according to claim 1, wherein a first wheel part of the sprocket wheel forms a half of the sprocket wheel, and a second wheel part of the sprocket wheel forms a half of the sprocket wheel.

3. A divisible sprocket wheel according to claim 1, wherein the first wheel part and the second wheel part are of different design.

4. A divisible sprocket wheel according to claim 1, wherein the first wheel part comprises the gear ring openings.

5. A divisible sprocket wheel according to claim 1, wherein the gear ring openings are substantially parallel.

6. A divisible sprocket wheel according to claim 1, wherein the at least one gear ring opening is a hole enclosed by the material of the gear ring.

7. A divisible sprocket wheel according to claim 1, wherein the at least one gear ring opening comprises a notch bounded by the material of the gear ring, which notch is open from a side of the gear ring.

8. A divisible sprocket wheel according to claim 1, wherein the recess in the body part is situated between the gear ring opening and the fastener housing.

9. A divisible sprocket wheel according to claim 1, wherein the recess in the body part comprises a lay-in slot.

10. A divisible sprocket wheel according to claim 9, wherein the lay-in slot is semicylindrical.

11. A divisible sprocket wheel according to claim 9, wherein the passage of the lay-in slot merges from a smaller passage adjacent the gear ring opening into a larger passage adjacent the fastener housing.

12. A divisible sprocket wheel according to claim 1, wherein the recess is of at least partly open design.

13. A divisible sprocket wheel according to claim 12, wherein a part of the recess situated nearer to the gear ring is designed as an open slot, and wherein a part of the recess situated nearer to the fastener housing is designed as a closed slot.

14. A method for connecting a divisible sprocket wheel built up from at least two synthetic wheel parts, comprising:

laying a fastener into a recess in a body part of the first wheel part through an open side of the recess, said recess aligning the fastener with a fastener hole formed in a fastener housing along a centerline;

urging the fastener in the recess along the centerline towards the fastener hole formed in the fastener housing extending over the at least two wheel parts using a fastening tool reaching through a gear ring opening, said recess having a wider passage than a passage of the gear ring opening; and fastening the fastener in the fastener housing extending over the at least two wheel parts.

15. A sprocket wheel comprising:

at least two wheel parts, at least one of said two wheel parts including at least a portion of a gear ring;

at least one fastener housing divided over the at least two wheel parts, said fastener housing having a fastener hole extending along a centerline;

at least one gear ring opening extending through the gear ring and aligned with the fastener hole; and a recess formed in at least one of said at least tow wheel parts in line between the gear ring opening and the fastener hole, said recess receiving a fastener from a side of the at least one of said at least two wheel parts and aligning the fastener with the fastener hole along the centerline.

* * * * *